United States Patent
Lee et al.

(10) Patent No.: US 9,958,609 B2
(45) Date of Patent: May 1, 2018

(54) METHOD OF MANUFACTURING NANO ANTENNA

(71) Applicant: SAMSUNG ELECTRONICS CO., LTD., Suwon-si (KR)

(72) Inventors: Changbum Lee, Seoul (KR); Duhyun Lee, Yongin-si (KR); Sunil Kim, Osan-si (KR); Jungwoo Kim, Hwaseong-si (KR); Byunggil Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 15/096,568

(22) Filed: Apr. 12, 2016

(65) Prior Publication Data

US 2017/0139137 A1    May 18, 2017

(30) Foreign Application Priority Data

Nov. 17, 2015    (KR) .......................... 10-2015-0161056

(51) Int. Cl.
| | |
|---|---|
| *B65B 33/00* | (2006.01) |
| *B05D 1/32* | (2006.01) |
| *G02B 6/13* | (2006.01) |
| *G02B 6/122* | (2006.01) |
| *B05D 7/00* | (2006.01) |
| *B05D 5/06* | (2006.01) |
| *B05D 3/00* | (2006.01) |
| *C23C 30/00* | (2006.01) |
| *C23C 28/00* | (2006.01) |

(52) U.S. Cl.
CPC ............... *G02B 6/13* (2013.01); *B05D 3/007* (2013.01); *B05D 5/06* (2013.01); *B05D 7/5883* (2013.01); *C23C 28/32* (2013.01); *C23C 28/345* (2013.01); *C23C 30/005* (2013.01); *G02B 6/1226* (2013.01)

(58) Field of Classification Search
CPC ....... G02F 1/0102; G02B 6/13; G02B 6/1226; G02B 5/008
See application file for complete search history.

(56) References Cited

U.S. PATENT DOCUMENTS

| | | | |
|---|---|---|---|
| 4,699,870 A * | 10/1987 | Iwadate | G03F 7/039 430/281.1 |
| 7,635,546 B2 | 12/2009 | Anderson et al. | |
| 9,632,216 B2 * | 4/2017 | Han | G02B 5/008 |
| 2004/0007454 A1 | 1/2004 | Gador et al. | |
| 2013/0057857 A1 * | 3/2013 | Jamshidi | G01N 21/658 356/301 |
| 2013/0148194 A1 * | 6/2013 | Altug | G01N 21/658 359/350 |
| 2015/0146180 A1 * | 5/2015 | Lee | G03F 7/2014 355/55 |

FOREIGN PATENT DOCUMENTS

| | | |
|---|---|---|
| JP | 2010-180095 A | 8/2010 |
| KR | 10-0765236 B1 | 10/2007 |
| KR | 10-0864536 B1 | 10/2008 |

* cited by examiner

*Primary Examiner* — Michael P Wieczorek
(74) *Attorney, Agent, or Firm* — Sughrue Mion, PLLC

(57) ABSTRACT

A method of manufacturing a nano antenna is provided. The method includes forming a material layer on a substrate, defining a portion of the material layer, forming an adhesion layer on the defined portion of the material layer, forming a nano antenna material layer on the adhesion layer, and removing the adhesion layer to thereby manufacture the nano antenna.

6 Claims, 6 Drawing Sheets

METHOD OF MANUFACTURING NANO ANTENNA

CROSS-REFERENCE TO RELATED APPLICATION

This application claims priority from Korean Patent Application No. 10-2015-0161056, filed on Nov. 17, 2015, in the Korean Intellectual Property Office, the disclosure of which is incorporated herein by reference in its entirety.

BACKGROUND

1. Field

The exemplary embodiments disclosed herein relate to methods of manufacturing a nano antenna.

2. Description of the Related Art

A nano antenna is used to receive and transmit light. Light having a wavelength that resonates with a nano antenna is transmitted and/or received by the nano antenna. According to the change of the refractive index of a transparent conductive layer adjacent to the nano antenna, the phase of the light emitted from the nano antenna may be changed.

A gold layer may be used as a material for the nano antenna. The gold layer may be patterned by using a lift-off process. However, since the gold layer has a poor adhesion force, the performance of a complete patterning of the gold layer may be difficult during the lift-off process and a portion of the gold layer may exfoliate.

SUMMARY

Exemplary embodiments provide methods of manufacturing a nano antenna, wherein the methods may prevent an adverse effect (for example, exfoliation of nano antenna material) that may occur in a process of patterning the nano antenna and may completely ensure operation characteristics of the nano antenna.

According to an aspect of an exemplary embodiment, there is provided a method of manufacturing a nano antenna, the method including: forming a material layer on a substrate; defining a portion of the material layer; forming an adhesion layer on the defined portion of the material layer; forming a nano antenna material layer on the adhesion layer; and removing the adhesion layer.

The defining of the portion of the material layer may include forming a mask that exposes the portion of the material layer on the material layer.

The forming of the material layer may include: forming a mirror layer on the substrate; forming a transparent conductive layer on the mirror layer; and forming an insulating layer on the transparent conductive layer.

The adhesion layer may include one of a chrome layer and a titanium layer.

The removing of the adhesion layer may include removing the adhesion layer using an ashing process.

The forming of the adhesion layer and the forming of the nano antenna material layer may include sequentially forming the adhesion layer and the nano antenna material after the forming of the mask, and the method may further include removing the mask before removing the adhesion layer.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
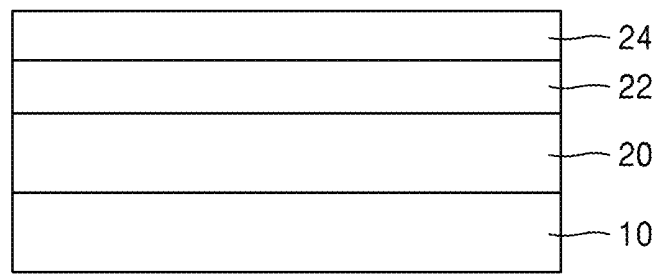
FIGS. 1, 2, 3, 4 and 5 are cross-sectional views illustrating a method of manufacturing a nano antenna, according to an exemplary embodiment.

Gold Au may be used as a material for forming a nano antenna. However, since a gold layer has poor adhesiveness, an exfoliation may occur during patterning. To prevent the exfoliation, an adhesion layer that has high adhesiveness is used, and the gold layer is patterned on the adhesion layer.

According to some currently developed nano antenna structures, a resonance phenomenon is needed at an interface between the gold layer and an insulating layer. However, since the adhesion layer is inserted between the gold layer and the insulating layer, the adhesion layer may have an adverse effect on the operation of the nano antenna and a normal operation of the nano antenna may therefore be limited.

In the method of manufacturing a nano antenna according to an exemplary embodiment, the adhesion layer is removed from the interface between the gold layer (also referred to as a nano antenna material layer) and the insulating layer to remove the adverse effect caused by the adhesion layer.

Hereinafter, a method of manufacturing a nano antenna according to an exemplary embodiment will be described in detail with reference to the accompanying drawings. In the drawings, the thicknesses of layers or regions may be exaggerated for clarity.

FIGS. 1 through 5 are cross-sectional views illustrating a method of manufacturing a nano antenna, according to an exemplary embodiment;

Referring to FIG. 1, a mirror layer 20 is formed on a substrate 10. The substrate 10 may be a surface of an apparatus on which a nano antenna is mounted. The mirror layer 20 is a reflection layer, for example, a gold layer. A transparent conductive layer 22 and an insulating layer 24 are sequentially formed on the mirror layer 20. The transparent conductive layer 22 may be, for example, a transparent conductive oxide (TCO) layer. The TCO layer may be, for example, one of an indium tin oxide (ITO) layer, an indium zinc oxide (IZO) layer, a gallium indium zinc oxide (GIZO) layer, an indium gallium zinc oxide (IGZO) layer, and a hafnium oxide (HfOx) layer. The insulating layer 24 may be, for example, an oxide layer. In this case, the oxide layer may be, for example, an aluminum oxide ($Al_2O_3$) layer. The mirror layer 20, the transparent conductive layer 22, and the insulating layer 24 that are sequentially formed on the substrate 10 may be collectively referred to as a "lower material layer".

Figure 2:
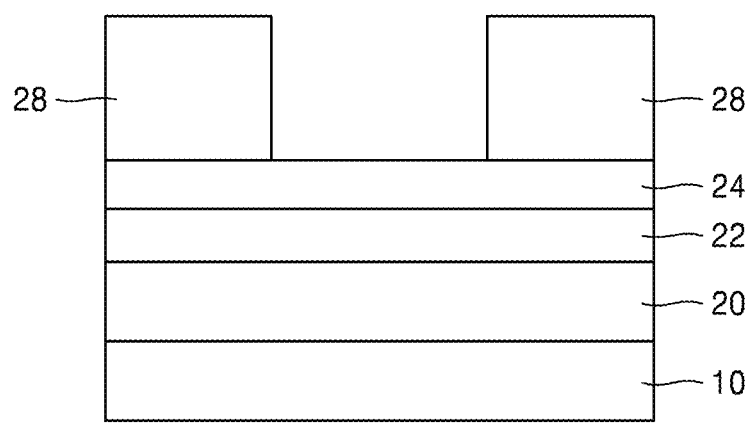

Next, as depicted in FIG. 2, a mask 28 is formed on the insulating layer 24. The mask 28 may be formed on only a region (e.g., less than an entire surface) of the insulating layer 24. Accordingly, after forming the mask 28, a portion of an upper surface of the insulating layer 24 is exposed. The mask 28 may be, for example, a photoresist film.

Figure 3:
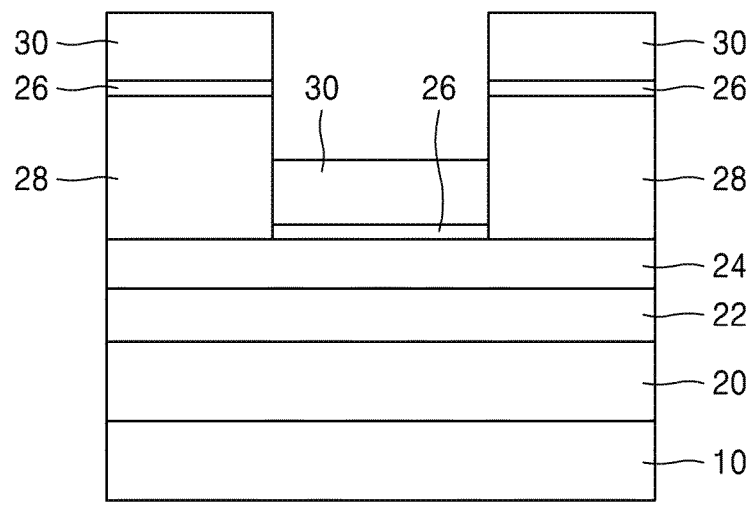

Next, after the mask 28 is formed, as depicted in FIG. 3, an adhesion layer 26 and a nano antenna material layer 30 are sequentially formed on the exposed portion of the insulating layer 24. The adhesion layer 26 may cover the entire exposed upper surface of the insulating layer 24 between the masks 28. The nano antenna material layer 30 may cover the entire upper surface of the adhesion layer 26. The nano antenna material layer 30 may have a thickness smaller than a thickness of the mask 28. The nano antenna material layer 30 may include, for example, a gold layer. When the adhesion layer 26 and the nano antenna material layer 30 are formed, the adhesion layer 26 and the nano antenna material layer 30 are also sequentially deposited on the mask 28. The adhesion layer 26 and the nano antenna material layer 30 that are deposited on the mask 28 are removed together with the mask 28 when the mask 28 is removed. The adhesion layer 26 may be formed to have a thickness that is less than a thickness of other layers. The adhesion layer 26 may prevent exfoliation of the nano antenna material layer 30 during a process for removing the mask 28, that is, during a lift-off process after forming the mask 28 and forming the nano antenna material layer 30 on a selected region by the mask 28. In other words, the adhesion layer 26 may prevent an adverse effect, for example, the exfoliation of the nano antenna pattern that may occur while forming a nano antenna pattern.

The adhesion layer 26 may be formed of many different materials that may attach the nano antenna material layer 30 to the insulating layer 24. The adhesion layer 26 may be, for example, one of a chrome layer and a titanium layer. Since the adhesion layer 26 is removed in a subsequent process, the adhesion layer 26 may be formed to have an appropriate thickness, for example, in a range from about 1 nm to about 10 nm, although is not limited thereto.

Figure 4:
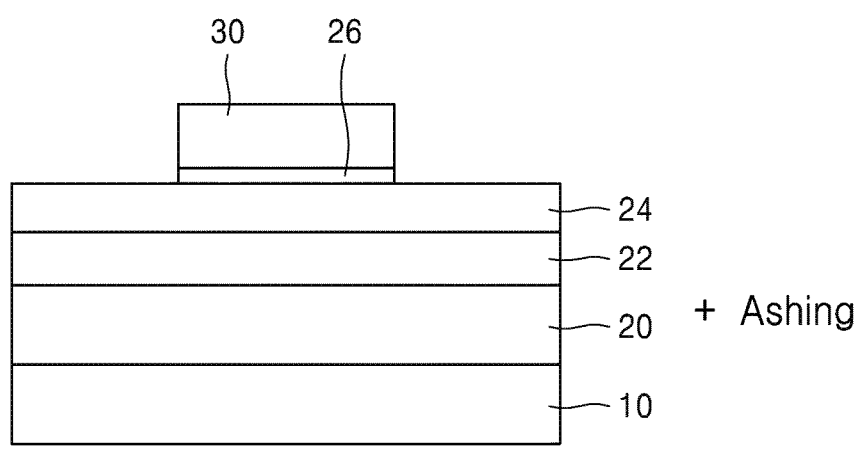

After sequentially forming the adhesion layer 26 and the nano antenna material layer 30, the mask 28 is removed. After the mask 28 is removed, as depicted in FIG. 4, the nano antenna material layer 30 remains only on the insulating layer 24. The nano antenna material layer 30 on the insulating layer 24 may not be exfoliated in the process of removing the mask 28 due to the adhesion layer 26 and may maintain a complete shape. After the mask 28 is removed, the nano antenna material layer 30 that remains on the insulating layer 24 may be substantially used as a nano antenna. The adhesion layer 26 between the nano antenna material layer 30 and the insulating layer 24 may be removed by using an appropriate process that may remove only the adhesion layer 26 by taking into account a material used for forming the adhesion layer 26. As an example, the adhesion layer 26 between the nano antenna material layer 30 and the insulating layer 24 may be removed by using an ashing process. In this case, the ashing process may be the same as an ashing process that is used for manufacturing semiconductor devices. The ashing process may act only on the adhesion layer 26 between the nano antenna material layer 30 and the insulating layer 24. The ashing process may not act on the other material layers or may only insignificantly act on the other material layers, and thus, may be negligible.

Figure 5:
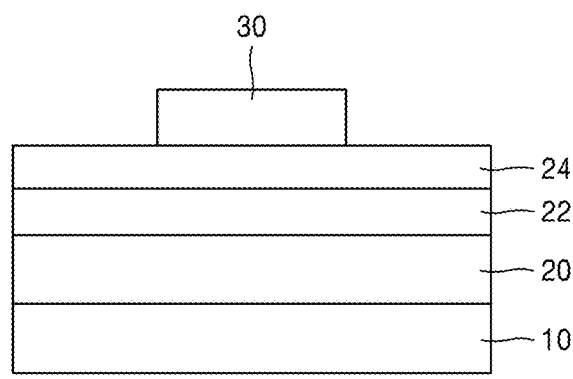

The adhesion layer 26 between the nano antenna material layer 30 and the insulating layer 24 may be removed by the ashing process. As a result, as depicted in FIG. 5, the nano antenna material layer 30 directly contacts the insulating layer 24. Since the adhesion layer 26 formed between the nano antenna material layer 30 and the insulating layer 24 is removed by the ashing process and the nano antenna material layer 30 is directly in contact with the insulating layer 24, a resonance phenomenon may occur in a normal fashion at an interface between the nano antenna material layer 30 and the insulating layer 24. Accordingly, an optical action (for example, a phase change of light, a change of a moving direction of light, etc.) of the nano antenna material layer 30 with respect to incident light may normally occur.

Figure 6:
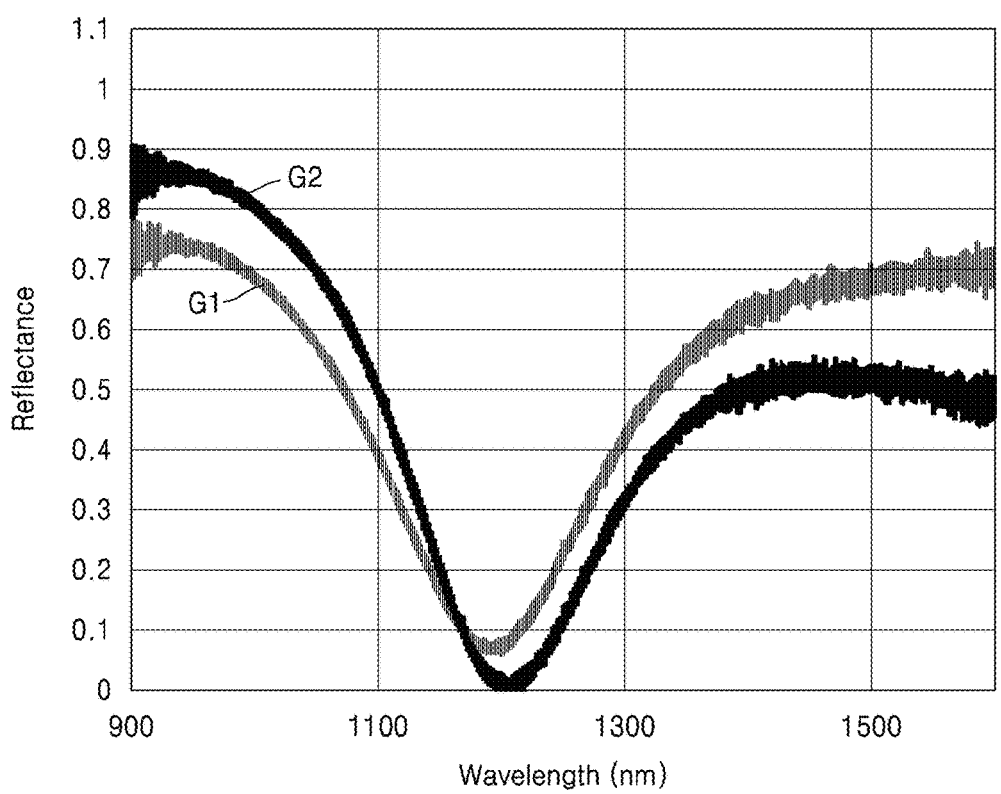
FIG. 6 is a graph showing the change of a resonance dip before and after performing an ashing process in a method of manufacturing a nano antenna, according to an exemplary embodiment.

FIG. 6 is a graph showing the change in a resonance dip before and after performing an ashing process for removing the adhesion layer 26 between the nano antenna material layer 30 and the insulating layer 24 in a method of manufacturing a nano antenna, according to an exemplary embodiment.

In FIG. 6, the horizontal axis indicates a wavelength of light incident to the nano antenna material layer 30 and the vertical axis indicates reflectance.

In FIG. 6, a first graph G1 shows a resonance dip before performing an ashing process and a second graph G2 shows a resonance dip after performing an ashing process.

When the first graph G1 is compared with the second graph G2 of FIG. 6, it is seen that, after performing the ashing process, the resonance dip is shifted to the right side and the reflectance is further reduced at the position of the resonance dip. The change which occurs before and after performing an ashing process in the method described above is that the adhesion layer 26 is removed from the interface between the nano antenna material layer 30 and the insulating layer 24. Accordingly, the result shown in FIG. 6 illustrates the benefits achieved when the adhesion layer 26 between the nano antenna material layer 30 and the insulating layer 24 is removed by the ashing process.

Figure 7A:
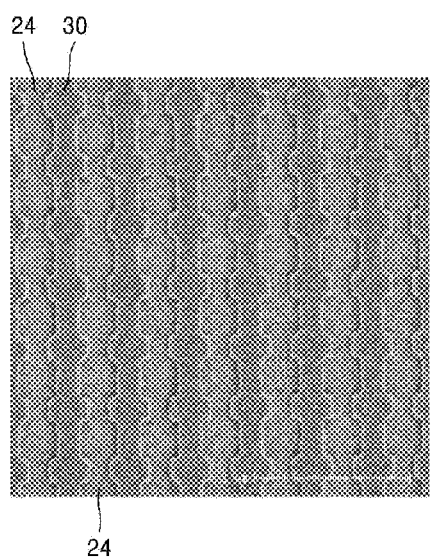
FIGS. 7A and 7B are plan views showing no size change of a nano antenna before and after performing an ashing process in a method of manufacturing a nano antenna, according to an exemplary embodiment.
Figure 7B:
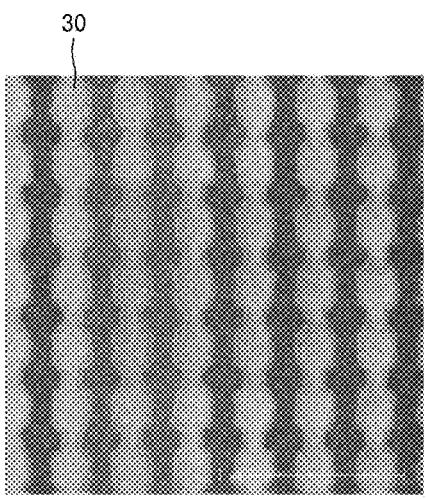

FIGS. 7A and 7B are plan views showing that a width of a nano antenna in a method of manufacturing a nano antenna, according to an exemplary embodiment, is not changed by an ashing process.

FIG. 7A is a plan view of the nano antenna material layer 30 before performing an ashing process, and FIG. 7B is a plan view of a nano antenna to which a series of processes are further performed after performing the ashing process.

When FIG. 7A is compared with FIG. 7B, the shape of the nano antenna material layer 30 is the same and a width and a length thereof are unchanged.

The result shown in FIGS. 7A and 7B illustrates that the ashing process may not affect the dimensions (shape, length, width, etc.) of the nano antenna material layer 30. In other words, the result shown in FIGS. 7A and 7B indicates that the dimensions of the nano antenna material layer 30 are not affected by the ashing process.

Figure 8A:
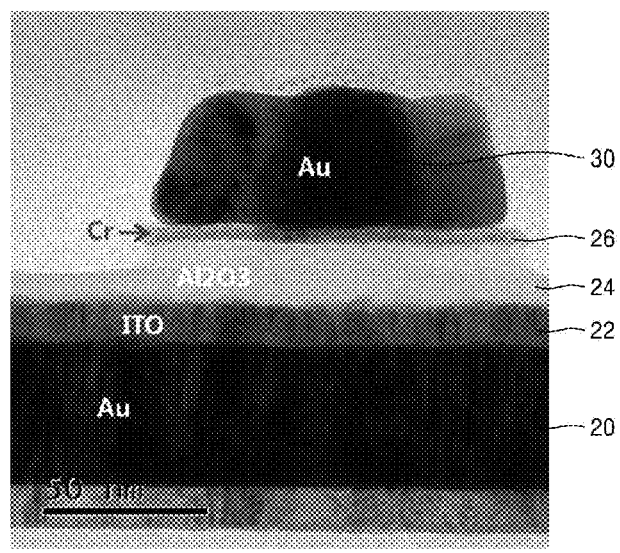
FIGS. 8A and 8B are transmission electron microscope (TEM) images showing a nano antenna is in contact with an insulating layer after removing an adhesion layer by using an ashing process in a method of manufacturing a nano antenna, according to an exemplary embodiment.
Figure 8B:
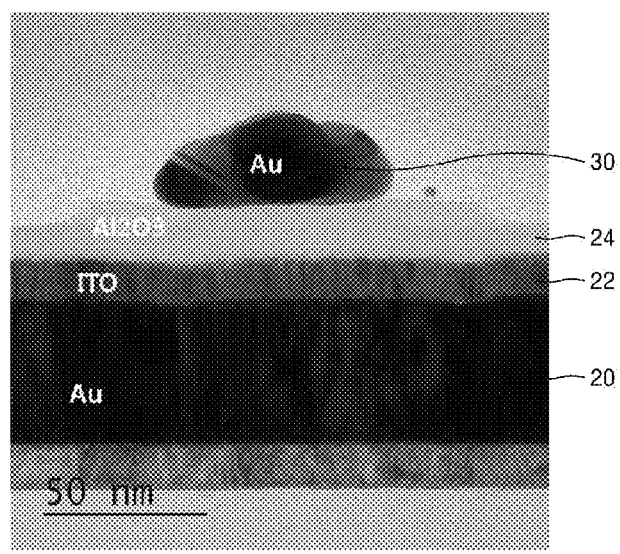

FIGS. 8A and 8B are transmission electron microscope (TEM) images of the nano antenna material layer 30 and a material layer structure below the nano antenna material layer 30 before and after performing an ashing process in a method of manufacturing a nano antenna described above, respectively.

FIG. 8A shows a TEM image of the nano antenna material layer 30 and the material layer structure below the nano antenna material layer 30 before performing an ashing process, and FIG. 8B shows a TEM image of the nano antenna material layer 30 and the material layer structure below the nano antenna material layer 30 to which a series of processes are further performed after performing an ashing process.

The size of the nano antenna material layer 30 of FIG. 8B is smaller than that of the nano antenna material layer 30 of FIG. 8A. This size decrease is the effect of subsequent processes after the ashing process, and not an effect of the ashing process.

When FIG. 8A is compared with FIG. 8B, after the adhesion layer 26 is removed from the interface between the nano antenna material layer 30 and the insulating layer 24, it is seen that the nano antenna material layer 30 is on the insulating layer and in contact with the insulating layer 24. In particular, FIG. 8B shows that the nano antenna material layer 30 is still in contact with the insulating layer 24 although a series of processes are further performed after the ashing process.

The result of FIG. 8 denotes that the nano antenna material layer 30 is safely on the insulating layer 24 and in contact with the insulating layer 24 without being exfoliated from the insulating layer 24 although the adhesion layer 26 is removed from an interface between the nano antenna material layer 30 and the insulating layer 24 by the ashing process.

Figure 9A:
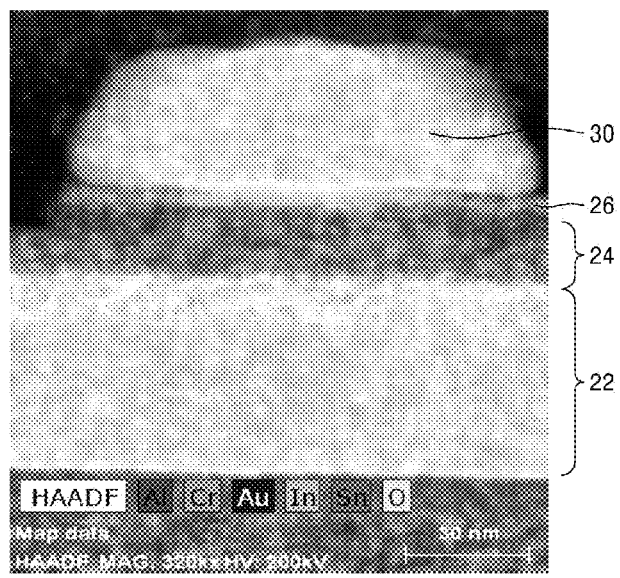
FIGS. 9A and 9B are composition analysis images showing a nano antenna is in contact with an insulating layer after removing an adhesion layer by using an ashing process in a method of manufacturing a nano antenna, according to an exemplary embodiment.
Figure 9B:
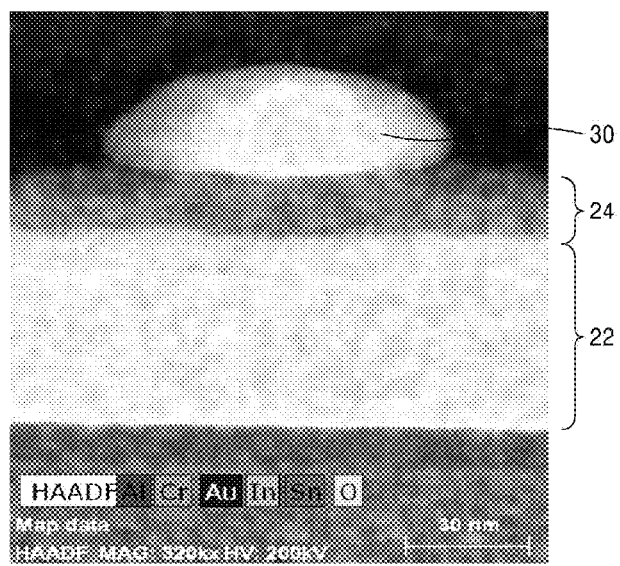

FIGS. 9A and 9B are images of a composition analysis of the nano antenna material layer 30 and the material layer structure below the nano antenna material layer 30 before and after performing an ashing process in a method of manufacturing a nano antenna, according to an exemplary embodiment.

FIG. 9A is an image of a composition analysis with respect to the nano antenna material layer 30 and the material layer structure below the nano antenna material layer 30 before performing an ashing process, and FIG. 9B is an image of a composition analysis of the nano antenna material layer 30 and the material layer structure below the nano antenna material layer 30 after further performing a series of processes after the ashing process. The size of the nano antenna material layer 30 of FIG. 9B is smaller than a size of the nano antenna material layer 30 of FIG. 9A. This size decrease is the result of subsequent processes after the ashing process, and not the result of the ashing process.

Images of FIGS. 9A and 9B show that the nano antenna material layer 30 is in contact with the insulating layer 24 after the adhesion layer 26 is removed from the interface between the nano antenna material layer 30 and the insulating layer 24 by the ashing process. In particular, FIG. 9B shows that the nano antenna material layer 30 is still in contact with the insulating layer 24 although various processes are further performed after the ashing process. The result of FIGS. 9A and 9B, similar to the result of FIGS. 8A and 8B, indicates that the nano antenna material layer 30 is safely on the insulating layer 24 and in contact with the insulating layer 24 without being exfoliated from the insulating layer 24 although the adhesion layer 26 is removed from an interface between the nano antenna material layer 30 and the insulating layer 24 by the ashing process.

While one or more exemplary embodiments have been described with reference to the figures, it will be understood by those of ordinary skill in the art that various changes in form and details may be made therein without departing from the spirit and scope as defined by the following claims.

What is claimed is:

1. A method of manufacturing a nano antenna, the method comprising:
    forming a material layer on a substrate;
    defining a portion of the material layer;
    forming an adhesion layer on the defined portion of the material layer;
    forming a nano antenna material layer on the adhesion layer; and
    removing the adhesion layer from underneath the nano antenna material layer formed thereon without removing the nano antenna material layer formed thereon.

2. The method of claim 1, wherein the defining the portion of the material layer comprises forming a mask that exposes the portion of the material layer on the material layer.

3. The method of claim 1, wherein the forming the material layer comprises:
    forming a mirror layer on the substrate;
    forming a transparent conductive layer on the mirror layer; and
    forming an insulating layer on the transparent conductive layer.

4. The method of claim 1, wherein the adhesion layer comprises one of a chrome layer and a titanium layer.

5. The method of claim 1, wherein the removing of the adhesion layer comprises removing the adhesion layer using an ashing process.

6. A method of manufacturing a nano antenna, the method comprising:
    forming a material layer on a substrate;
    forming a mask on the material layer, wherein the mask exposes a defined portion of the material layer;
    forming an adhesion layer on the defined portion of the material layer, while the mask is present;
    forming a nano antenna material layer on the adhesion layer, while the mask is present;
    removing the mask; and
    removing the adhesion layer subsequent to the removing the mask.

* * * * *